United States Patent
Hyde et al.

(10) Patent No.: US 10,403,147 B2
(45) Date of Patent: *Sep. 3, 2019

(54) SYSTEMS AND METHODS FOR AUTOMATICALLY DOCUMENTING AN ACCIDENT

(71) Applicant: Elwha LLC, Bellevue, WA (US)

(72) Inventors: Roderick A. Hyde, Redmond, WA (US); Jordin T. Kare, San Jose, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/912,287

(22) Filed: Mar. 5, 2018

(65) Prior Publication Data
US 2018/0197416 A1  Jul. 12, 2018

Related U.S. Application Data

(63) Continuation of application No. 15/289,557, filed on Oct. 10, 2016, now Pat. No. 9,911,335, which is a
(Continued)

(51) Int. Cl.
*G08G 1/16* (2006.01)
*G06Q 40/08* (2012.01)
(Continued)

(52) U.S. Cl.
CPC .............. *G08G 1/166* (2013.01); *G08G 1/16* (2013.01); *B60Q 1/08* (2013.01); *B60Q 1/24* (2013.01);
(Continued)

(58) Field of Classification Search
CPC .............. B60Q 2300/47; B60Q 3/0286; B60R 2021/0002; B60R 2021/0004;
(Continued)

(56) References Cited

U.S. PATENT DOCUMENTS 6,278,924 B1   8/2001   Gioutsos et al.
7,705,748 B2 *  4/2010   Fu ...................... B60Q 9/008
                                                    340/425.5
(Continued)

FOREIGN PATENT DOCUMENTS

EP        1944189        7/2008

OTHER PUBLICATIONS

PCT International Search Report, Application No. PCT/US2014/052879, dated Nov. 28, 2014, pp. 1-3.

*Primary Examiner* — Van T Trieu
(74) *Attorney, Agent, or Firm* — Foley & Lardner LLP

(57) ABSTRACT

A system for documenting an accident includes a vehicle that includes a transceiver device and a processing circuit. The processing circuit is configured to receive data from a collision detection device of the vehicle, determine, based on the received data, that an accident is impending or occurring involving the vehicle, generate a request for a nearby vehicle, and transmit, via the transceiver device, the request to the nearby vehicle. The request is for the nearby vehicle to illuminate a region associated with the accident, actively acquire data related to the accident, and record actively acquired data related to the accident.

35 Claims, 10 Drawing Sheets

Related U.S. Application Data continuation of application No. 14/091,133, filed on Nov. 26, 2013, now Pat. No. 9,472,104.

(51) Int. Cl.
| | |
|---|---|
| *G08G 1/017* | (2006.01) |
| *G08G 1/04* | (2006.01) |
| *G07C 5/00* | (2006.01) |
| *B60Q 1/08* | (2006.01) |
| *B60Q 1/24* | (2006.01) |
| *G07C 5/08* | (2006.01) |

(52) U.S. Cl.
CPC ......... *B60Q 2300/47* (2013.01); *G06Q 40/08* (2013.01); *G07C 5/008* (2013.01); *G07C 5/085* (2013.01); *G08G 1/0175* (2013.01); *G08G 1/04* (2013.01)

(58) Field of Classification Search
CPC .... B60R 2021/0006; B60R 2021/0009; B60R 2021/0011; B60R 2021/0134; B60R 2021/0136; G08G 1/16; G08G 1/166
See application file for complete search history.

(56) References Cited

U.S. PATENT DOCUMENTS

| | | |
|---|---|---|
| 8,520,695 B1 | 8/2013 | Rubin et al. |
| 8,779,936 B2 | 7/2014 | Choi et al. |
| 8,954,226 B1 | 2/2015 | Binion et al. |
| 9,373,207 B2 | 6/2016 | Ricci et al. |
| 9,378,602 B2 | 6/2016 | Ricci et al. |
| 2003/0212567 A1 | 11/2003 | Shintani et al. |
| 2005/0122235 A1* | 6/2005 | Teffer ............... G08G 1/01 340/937 |
| 2007/0005202 A1 | 1/2007 | Breed |
| 2007/0032928 A1 | 2/2007 | Kuwahara |
| 2010/0145618 A1 | 6/2010 | Lin et al. |
| 2010/0305858 A1 | 12/2010 | Richardson |
| 2013/0018572 A1 | 1/2013 | Jang |
| 2015/0094013 A1 | 4/2015 | Dimitri et al. |
| 2015/0112545 A1 | 4/2015 | Binion et al. |

\* cited by examiner

SYSTEMS AND METHODS FOR AUTOMATICALLY DOCUMENTING AN ACCIDENT

CROSS-REFERENCE TO RELATED APPLICATIONS

This application is a continuation of U.S. patent application Ser. No. 15/289,557, filed Oct. 10, 2016, now U.S. Pat. No. 9,911,335, issued Mar. 6, 2018, which is a continuation of U.S. patent application Ser. No. 14/091,133, filed Nov. 26, 2013, now U.S. Pat. No. 9,472,104, issued Oct. 18, 2016, each of which are incorporated herein by reference in their entirety and for all purposes.

BACKGROUND

Often, when a car accident occurs, the drivers involved in the accident call the police to document the accident. Each driver will give his or her side of events, and will attempt to provide relevant details, such as the speed and direction that the cars were heading at the time of the accident, etc. Based on these details, the police ultimately determine who is at fault, and an insurance company will also make its own determination of fault based on the police report and driver statements. Frequently, a driver has little factual support, other than his or her statements, in attempting to prove details related to the accident.

SUMMARY

One embodiment relates to a system for documenting an accident. The system includes a vehicle comprising a transceiver device and a processing circuit. The processing circuit is configured to: receive data from a collision detection device of the vehicle; determine, based on the received data, that an accident is impending or occurring involving the vehicle; and generate a request for a nearby vehicle to: illuminate a region associated with the accident and actively acquire data related to the accident; and record actively acquired data related to the accident. The processing circuit is further configured to transmit, via the transceiver device, the request to the nearby vehicle.

Another embodiment relates to a method of documenting an accident. The method includes: receiving data from a collision detection device of a vehicle; determining, by a processing circuit, that based on the received data an accident is impending or occurring involving the vehicle; and generating a request for a nearby vehicle to: illuminate a region associated with the accident and actively acquire data related to the accident; and record actively acquired data related to the accident. The method further includes transmitting the request to the nearby vehicle.

Another embodiment relates to a non-transitory computer-readable medium having instructions stored thereon, that when executed by a computing device cause the computing device to perform operations for documenting an accident. The operations include: receiving data from a collision detection device of a vehicle; determining, based on the received data, that an accident is impending or occurring involving the vehicle; and generating a request for a nearby vehicle to: illuminate a region associated with the accident and actively acquire data related to the accident; and record actively acquired data related to the accident. The operations further include transmitting the request to the nearby vehicle.

Another embodiment relates to a system for documenting an accident. The system includes a vehicle comprising a collision detection device comprising at least one of a radar device and a lidar device, where the collision detection device is configured to illuminate and actively detect a nearby vehicle, a storage device, and a processing circuit. The processing circuit is configured to: receive data from the collision detection device; analyze the received data to detect an impending or occurring accident, where the accident involves the nearby vehicle; determine, accident related data in response to the detected accident, where the accident related data is based on the received data; store the accident related data in the storage device; and deliver the accident related data to the nearby vehicle.

Another embodiment relates to a method of documenting an accident. The method includes: illuminating and actively detecting a nearby vehicle using a collision detection device of a vehicle, where the collision detection device comprises at least one of a radar device and a lidar device; receiving data from the collision detection device of the vehicle; analyzing, by a processing circuit, the received data to detect an impending or occurring accident, where the accident involves the nearby vehicle; determining accident related data in response to the detected accident, where the accident related data is based on the received data; storing the accident related data in a storage device; and delivering the accident related data to the nearby vehicle.

Another embodiment relates to a non-transitory computer-readable medium having instructions stored thereon, that when executed by a computing device cause the computing device to perform operations for documenting an accident. The operations include: illuminating and actively detecting a nearby vehicle using a collision detection device of a vehicle, where the collision detection device comprises at least one of a radar device and a lidar device; receiving data from the collision detection device of the vehicle; analyzing the received data to detect an impending or occurring accident, where the accident involves the nearby vehicle; determining accident related data in response to the detected accident, where the accident related data is based on the received data; storing the accident related data in a storage device; and delivering the accident related data to the nearby vehicle.

Another embodiment relates to a system for documenting an accident. The system includes a vehicle comprising a collision detection device, a nearby vehicle detection device, a storage device, and a processing circuit. The processing circuit is configured to: receive data from the nearby vehicle detection device, wherein the data includes data related to a nearby vehicle; receive data from the collision detection device; determine, based on the received data from the collision detection device, that an accident is impending or occurring involving the vehicle; analyze the received data from the nearby vehicle detection device to detect an ID of the nearby vehicle; and store the detected ID in the storage device.

Another embodiment relates to a method of documenting an accident. The method includes: receiving data from a nearby vehicle detection device of a vehicle, wherein the data includes data related to a nearby vehicle; receiving data from a collision detection device of the vehicle; determining, by a processing circuit, that based on the received data from the collision detection device an accident is impending or occurring involving the vehicle; analyzing the received data from the nearby vehicle detection device to detect an ID of the nearby vehicle; and storing the detected ID in a storage device.

Another embodiment relates to a non-transitory computer-readable medium having instructions stored thereon, that when executed by a computing device cause the computing device to perform operations for documenting an accident. The operations include: receiving data from a nearby vehicle detection device of a vehicle, wherein the data includes data related to a nearby vehicle; receiving data from a collision detection device of the vehicle; determining that based on the received data from the collision detection device an accident is impending or occurring involving the vehicle; analyzing the received data from the nearby vehicle detection device to detect an ID of the nearby vehicle; and storing the detected ID in a storage device.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
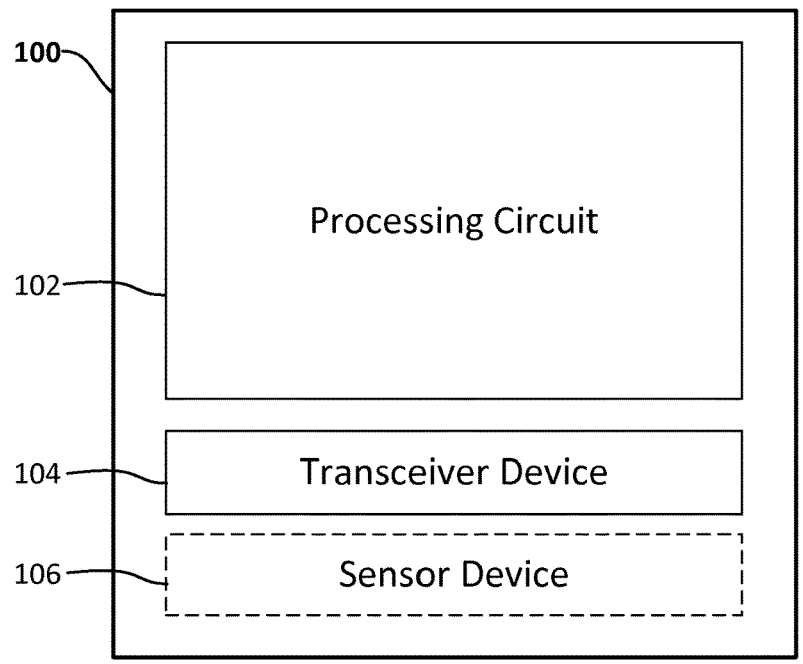
FIG. 1 is a block diagram of a system for documenting an accident according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to the figures, various embodiments of systems and methods for documenting an accident are shown and described. It is often the case that when a car accident occurs, the drivers involved are primarily responsible for providing the details of the accident. For example, a driver may be required to recall a speed of his vehicle (car, truck, motorcycle, etc.) and a direction the vehicle was travelling at the time of the accident. However, these details are reliant on the driver's recollection of the accident, and the driver may not have been paying close attention to such details when the accident occurred.

According to various embodiments, a processing circuit is utilized to request and/or automatically record data related to a vehicular accident. For example, a car that is involved in an accident can detect that the accident is impending or occurring, and the processing circuit of the car can generate a request for a nearby vehicle (i.e. a "witness" vehicle) to record data related to the accident. By doing so, the nearby vehicle can provide a witness perspective of the accident, and the data recorded can be used in determining liability, damages, etc. The nearby vehicle can be equipped with radar or lidar systems that generate data related to the position, direction of motion, speed, orientation, and/or contour of vehicles involved in the accident. The nearby vehicle can also record specific timing information related to the accident. Any recorded data may be stored by a storage system of the nearby vehicle, the data may be transmitted back to the car that generated the request, or the data may be transmitted to a remote location (e.g., a website, online storage, etc.). As another example, a car may be equipped with a processing circuit configured to detect an accident that is impending or occurring that involves other vehicles (and not the car). Upon detecting the accident of the other vehicle(s), the car can automatically generate data related to the accident (e.g., using radar or lidar systems of the car), and the accident related data may then be stored or transmitted. Additionally, the processing circuit of any of the embodiments herein may be used to determine and store ID information (e.g., license plate numbers, RFID tag information, etc.) related to a vehicle involved in or witnessing an accident, as will be discussed further herein. For example, a car that is involved in an accident may automatically detect and record ID information of a nearby witness vehicle. The car may use a camera, an RFID sensor, radar, lidar, or other collision detection systems/devices of the vehicle to detect the ID information. For example, images from a camera may be analyzed to determine license plate information. As another example, an RFID sensor may be used to determine an RFID tag of a nearby vehicle. It should be understood that although this disclosure often refers to a "nearby vehicle," interactions with multiple nearby vehicles are within the scope of the present application.

Referring to FIG. 1 a block diagram of system 100 for documenting an accident is shown. According to one embodiment, system 100 includes processing circuit 102 and transceiver device 104. System 100 may also include sensor device 106. Processing circuit 102 is generally configured to interface with an accident detection system of a vehicle. For example, processing circuit 102 may receive real-time data from the accident detection system. In one embodiment, the accident detection system includes camera, radar, and/or lidar devices. Such camera, radar, and lidar devices generally provide data related to the direction/orientation of detected objects, the contour of objects, and the motion of objects (e.g., vehicles on the road, etc.). Based on the information from the camera, radar, and/or lidar devices, the accident detection system or processing circuit 102 can determine that an accident that involves the vehicle is impending or occurring. In response to such a detected accident, processing circuit generates a request to be transmitted to a nearby vehicle, where the request is for the nearby vehicle to record details related to the accident. The request may be transmitted via transceiver device 104. The request may be selectively transmitted only to a specific nearby vehicle or a set of nearby vehicles, or may be transmitted (i.e., broadcast) for reception by all nearby vehicles. Transceiver device 104 includes all components necessary to transmit and receive data. For example, transceiver device 104 may include a radiofrequency transmitter and a radiofrequency antenna, etc. In some embodiments, system 100 includes sensor device 106, which is generally configured to provide data related to an ID of a nearby vehicle. For example, sensor device 106 may include a camera configured to provide video data. From the video data, processing circuit 102 may determine a license plate number of a nearby vehicle. As another example, sensor device 106 may include an RFID sensor configured to provide RFID data. From the RFID data, processing circuit 102 may determine an RFID tag of a nearby vehicle. The RFID tag may include license plate information, or other identification information.

Figure 2:
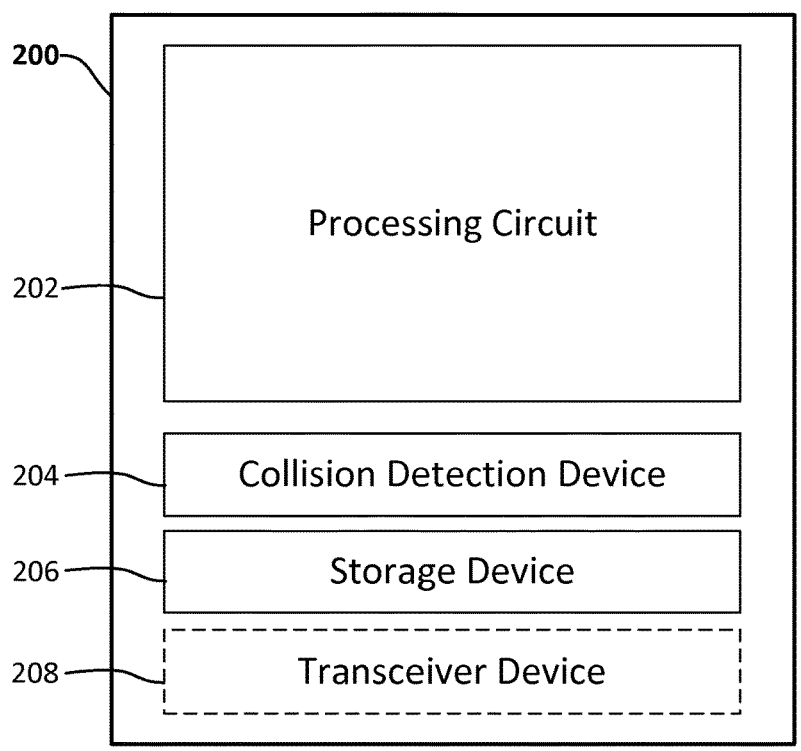
FIG. 2 is a block diagram of a system for documenting an accident according to one embodiment.

Referring to FIG. 2 a block diagram of system 200 for documenting an accident is shown. According to one embodiment, system 200 includes processing circuit 202, collision detection device 204, and storage device 206. System 200 may also include transceiver device 208. Processing circuit 202 is generally configured to interface with collision detection device 204 to detect an impending or occurring accident involving other vehicles. Collision detection device 204 is configured to provide radar and/or lidar data related to objects (i.e. nearby vehicles) detected using radar or lidar signals, respectively. Collision detection device 204 includes all components necessary (e.g., one or more sensors integrated or coupled to the vehicle) to generate such data and provide the data to processing circuit 202. Processing circuit 202 analyzes the radar and/or lidar data provided to detect an accident. Upon detecting the accident, processing circuit 202 determines relevant details related to the accident (e.g., position of a vehicle, direction of motion of a vehicle, speed of a vehicle, angular motion of a vehicle, orientation of a vehicle, etc.). The details related to the accident may then be stored in storage device 206, which includes components necessary to store data (e.g., physical hard drives, flash storage, etc.). Additionally, processing circuit 202 may store raw radar and/or lidar data from collision detection device 204. In some embodiments, system 200 includes transceiver device 208, which includes all components necessary to transmit and receive data. Any stored data and any data generated by collision detection device 204 and processing circuit 202 may be transmitted via transceiver device 208.

Figure 3:
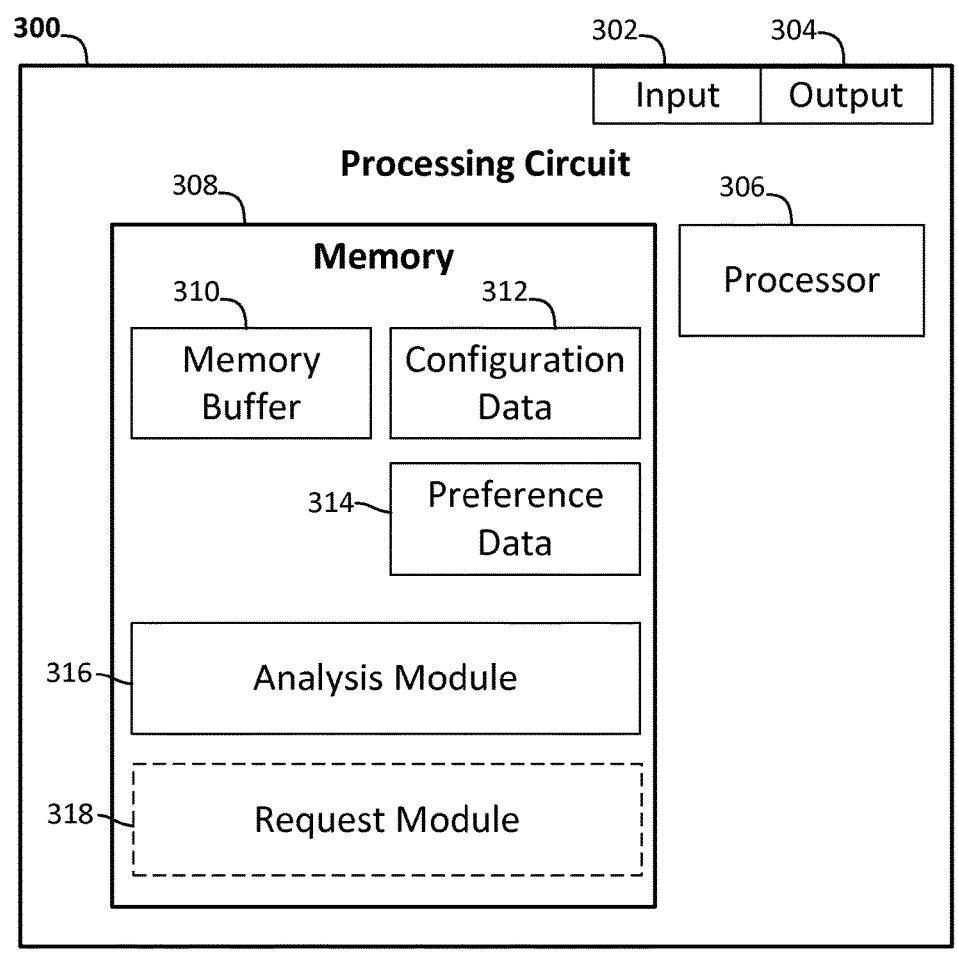
FIG. 3 is a block diagram of a processing circuit according to one embodiment.

Referring to FIG. 3, a block diagram of processing circuit 300 for completing the systems and methods of the present disclosure is shown according to one embodiment. Processing circuit 300 is generally configured to communicate with a collision detection system (e.g., collision detection device 204) of a vehicle. Processing circuit 300 can analyze data provided by the collision detection system to determine that an accident has occurred or is about to occur involving the vehicle or other additional vehicles. In some embodiments, processing circuit 300 is configured to generate a request to be transmitted to a nearby vehicle. The request is for the nearby vehicle to illuminate the accident scene with radar or lidar probe beams and to hence actively acquire radar or lidar data related to the accident. The request additionally is for the nearby vehicle to record actively acquired radar or lidar data related to the accident. The request for recorded data may encompass both the data acquired in response to the request, as well as previously acquired data concerning the accident (e.g., concerning the location, the requesting vehicle or additional vehicles in the vicinity). Processing circuit 300 may accept input data continuously or periodically. Processing circuit 300 also generates metadata to be included as part of a request. Any of the data generated by processing circuit 300 may also be based on user input or configuration data. In analyzing data from the collision detection system (e.g., camera, RFID, radar, or lidar data), and in generating a request to be transmitted, processing circuit 300 may make use of machine learning, artificial intelligence, interactions with databases and database table lookups, pattern recognition and logging, intelligent control, neural networks, fuzzy logic, etc. Processing circuit 300 further includes input 302 and output 304. Input 302 is configured to receive a data stream (e.g., a digital or analog stream of data) and configuration information. Output 304 is configured to output data for transmission (e.g., a request to be transmitted) or for use in a configuration process of a device having processing circuit 300.

According to one embodiment, processing circuit 300 includes processor 306. Processor 306 may be implemented as a general-purpose processor, an application specific integrated circuit (ASIC), one or more field programmable gate arrays (FPGAs), a digital-signal-processor (DSP), a group of processing components, or other suitable electronic processing components. Processing circuit 300 also includes memory 308. Memory 308 is one or more devices (e.g., RAM, ROM, Flash Memory, hard disk storage, etc.) for storing data and/or computer code for facilitating the various processes described herein. Memory 308 may be or may include non-transient volatile memory or non-volatile memory. Memory 308 may include database components, object code components, script components, or any other type of information structure for supporting the various activities and information structures described herein. Memory 308 may be communicably connected to processor 306 and provide computer code or instructions to processor 306 for executing the processes described herein (e.g., the processes shown in FIGS. 5-10). Memory 308 includes memory buffer 310. Memory buffer 310 is configured to receive a data stream from a user input and/or components of a collision detection system through input 302. For example, the data may include input related to radar information or lidar information that was generated by the collision detection system. The data received through input 302 may be stored in memory buffer 310 until memory buffer 310 is accessed for data by the various modules of memory 308. For example, analysis module 316 can access the data that is stored in memory buffer 310. Any data received through input 302 may also be immediately accessed.

Memory 308 further includes configuration data 312. Configuration data 312 includes data related to processing circuit 300. For example, configuration data 312 may include information related to interfacing with other components (e.g., components of a collision detection system, etc.). This may also include the command set needed to interface with a computer system used configure a system having processing circuit 300. This may also include the command set needed to generate a user interface or to communicate with other user interface components of the vehicle (e.g., a touch screen display, etc.). Based on data stored in configuration data 312, processing circuit 300 may format data for output via output 304, which may include formatting data for transmission, etc. For example, processing circuit 300 may generate a request and format the request to be transmitted via a radiofrequency transceiver. Processing circuit 300 may also format data for transmission according to any protocols or standards as specified by configuration data 312. Configuration data 312 may further include information as to how often input should be accepted from a collision detection system. Configuration data 312 may include default values required to initiate communication with any components of the system having processing circuit 300. Configuration data 312 further includes data to configure communication between the various components of processing circuit 300. Memory 308 further includes preference data 314, which is configured to store various user preferences and settings related to the systems described herein. For example, the described systems may be enabled or disabled by a user as specified by preference data 314.

Memory 308 further includes analysis module 316. Analysis module 316 is configured to receive data from a collision detection system of a vehicle (e.g., collision detection device 204) and to determine whether an accident is impending/occurring involving the vehicle or another nearby vehicle. Analysis module 316 may determine the accident based on the data provided, or analysis module 316 may be provided an indicator from collision detection system specifying that the collision detection system has detected the accident. Analysis module 316 also may access configuration information and other data as provided by processing circuit 300. In one embodiment, analysis module 316 instructs request module 318 to generate a request to be transmitted to nearby vehicles.

In one embodiment, analysis module 316 determines if an accident involving the vehicle having processing circuit 300 is impending or is occurring. Analysis module 316 determines the accident by analyzing the data provided from the collision detection system of the vehicle. Analysis module 316 may also access other sensor data (e.g., cameras) and systems of the vehicle to determine operational characteristics of the vehicle (e.g., current speed, current direction, etc.). The collision detection system of the vehicle is generally equipped with radar and/or lidar detection devices. The detection devices generally scan the area around the vehicle and provide information related to objects as discerned from reflected radar and/or lidar signals. Based on these signals, analysis module 316 may decide whether an accident is about to occur, or if the accident is already occurring or has occurred. For example, analysis module 316 may determine that another vehicle is 10 feet in front of the vehicle and is moving 40 mph more slowly than the vehicle is moving. Based on those characteristics, analysis module 316 may conclude that a collision is imminent. As another example, analysis module 316 may detect a sudden change in velocity of the vehicle or another vehicle. As another example, analysis module 316 may determine that another vehicle (or object) is less than a foot from the vehicle, and thus, an accident is occurring, or has occurred. In determining an accident, analysis module 316 may access a priori knowledge relating to the vehicle. For example, analysis module 316 may access configuration data 312 for braking capabilities, steering and handling capabilities, contour and dimension information, weight information, acceleration/deceleration characteristics, etc. Upon detecting an accident, analysis module 316 can direct request module to generate a request to be transmitted to a nearby vehicle so the nearby vehicle acquires and records information related to the accident.

In one embodiment, the collision detection system of the vehicle includes additional sensor devices that provide data to be analyzed by analysis module 316. For example, the collision detection system may include a camera (that captures still images or video), and analysis module 316 may determine that an accident is in progress or has occurred, in part, based on the position or motion of a proximate vehicle that is detected. As another example, the collision detection system may include a microphone device, and analysis module 316 may determine that an accident is in progress or has occurred, in part, based on a loud braking noise or collision noise that is detected. As another example, the collision detection system may interface with the braking systems of the vehicle provide information related to the brakes as they are applied by the driver (e.g., pressures, braking lengths, etc.). As another example, the collision detection system may interface with an airbag system of the vehicle, and analysis module 316 may base an accident determination on whether an airbag has been deployed. As another example, the collision detection system may include an accelerometer, and analysis module 316 may base an accident determination on acceleration/deceleration values.

In one embodiment, analysis module 316 records ID information related to nearby vehicles (e.g., witness vehicles). A vehicle may be equipped with a nearby vehicle detection device capable of detecting nearby vehicles. The nearby vehicle detection device may be separate from or part of a collision detection system (e.g., collision detection device 204) of the vehicle. For example, the vehicle may have a camera system that provides image data to analysis module 316. Analysis module 316 may analyze the image data to determine a license plate number of a vehicle. Analysis module 316 may make use various optical character recognition algorithms in detecting a license plate number. Alternatively, analysis module 316 may use object recognition algorithms to detect a perimeter of the license plate, and store an image including the license plate. As another example, a vehicle may be equipped with an RFID scanning system that provides data to analysis module 316. Based on the RFID data, analysis module 316 may determine ID information for a vehicle. For example, the RFID data may include information for a detected RFID tag of a nearby vehicle. The RFID tag may include the license plate number, or any other identification information for the nearby vehicle (e.g., a VIN number, make and model information, a driver's license number, etc.). Any ID information determined by analysis module 316 may be stored in a storage system of the vehicle (e.g., in memory 308, a hard disk, flash memory, etc.), or it may be transmitted (via a transceiver device). Additional information that is related to the nearby vehicle may also be determined. For example, analysis module 316 may process information from radar and/or lidar systems of the vehicle to determine the position, direction of motion, speed, orientation, and/or contour of a nearby vehicle. The additional information may be stored and/or transmitted along with the ID information. In one embodiment, analysis module 316 analyzes data from a collision detection device of the vehicle to determine whether or not a nearby vehicle was involved in the accident. A determination that the nearby vehicle was not involved in the accident may precede any additional ID information analysis related to the nearby vehicle (e.g., the nearby vehicle may be required to be an uninvolved witness vehicle, etc.). Any of the analysis described herein may also be responsive to a determination that an accident is impending or occurring. In one embodiment, the nearby vehicle is one to which a request as described herein was transmitted (e.g., a request to illuminate a region associated with the accident, to actively acquire data related to the accident, and to record the actively acquired data related to the accident, etc.).

In one embodiment, analysis module 316 receives data from a collision detection device of the vehicle. As discussed above, the collision detection device generally contains one or more radar and/or lidar devices, and may contain additional sensors and components (e.g., cameras, ultrasonic sensors, microphones, etc.). Analysis module 316 analyzes the data from the collision detection device to detect an accident (impending, accruing, or occurred) involving another nearby vehicle (or vehicles). For example, analysis module 316 may analyze radar information to determine that a vehicle in the next lane has rapidly reduced its velocity (e.g., if the driver of the nearby vehicle engaged the brakes, etc.). As another example, analysis module 316 may analyze radar information to determine that two vehicles' projected paths will collide in a certain amount of time. Analysis module 316 may also detect an accident involving other vehicles by interfacing the additional sensors and components of the collision detection device. For example, analysis module 316 may receive audio information and detect a nearby collision sound. As another example, analysis module 316 may receive camera information and analyze images provided by the camera in conjunction with radar information. Any combination of data (e.g., lidar data and camera data, radar data and audio data, etc.) may be used in detecting an accident. Upon detecting an accident, analysis module 316 module may automatically record data related to the accident (e.g., in storage device 206, etc.). Analysis module 316 may record all data (e.g., raw data from all radar or lidar devices), may detect processed data (e.g., position or motion parameters derived from raw data), or may select relevant data (e.g., only data from certain sensors/devices). In one embodiment, analysis module 316 causes processing circuit 300 to accept data at a maximum possible data rate from the various devices discussed herein. Analysis module 316 may also encrypt any data that is stored, and an encryption standard and encryption key may be specified by configuration data 312 or preference data 314.

Analysis module 316 may determine and record specific types of data based on the data received from the collision detection device. In one embodiment, analysis module 316 determines position coordinates of a nearby vehicle. Analysis module 316 may access GPS or mapping information of the vehicle having processing circuit 300 (e.g. from a GPS system or mapping application of the vehicle), and analysis module 316 may store those coordinates along with distance and direction information based on a radar or lidar signal. The coordinates of the nearby vehicle may then be calculated based on the distance and direction the nearby vehicle is from the vehicle. In one embodiment, analysis module 316 determines the velocity and orientation information of the nearby vehicle. In one embodiment, analysis module 316 determines timing information that is stored along with any other determined data. The timing information may be stored with a high precision (e.g., including milliseconds, microseconds, nanoseconds, etc.). Any data that is described herein may be time stamped such that a precise sequence of events may be recreated upon later analysis of stored data. In one embodiment, analysis module 316 determines contour information related to the nearby vehicle. Such information may be compared to a database of vehicle model information (stored by storage systems of the vehicle, or remotely accessed) to determine a likely make and model of the nearby vehicle.

In one embodiment, analysis module 316 may determine that an accident has or is about to occur, at least partially in response to receiving a request to acquire and record data from a requesting vehicle. For example, in an embodiment having a transceiver device (e.g., transceiver device 208), which may be a radiofrequency transmitter, the request may be received by the transceiver device. Upon receipt of the request, analysis module 316 may actively acquire (i.e., by use of illumination and sensing with radar or lidar sensors) and record data from the collision detection device. Analysis module 316 may also analyze the request, which may include identification or positioning information so that analysis module 316 can determine a precise location of which to monitor (e.g., which car to monitor, whether the requesting vehicle or the referenced accident site is on the left side or right side of the car, etc.). Additionally, the request may specify that any recorded data should be transmitted back to the requesting vehicle, or to another location. Analysis module 316 may interface with the transceiver device and provide the signals necessary so that any accident related data generated by analysis module 316 is transmitted in accordance with the request. For example, analysis module 316 may cause the transceiver device to emit a radiofrequency signal to wirelessly transmit the recorded accident related data.

Request module 318 is configured to generate a request for a nearby vehicle, and to control the transmission of the request. The request is for the nearby vehicle to actively acquire (by illuminating a region associated with the accident using radar or lidar probe signals and sensing with radar or lidar sensors) and record information related to an accident involving the requesting vehicle. Request module 318 generates such a request in response to analysis module 316, which detects the accident as it is in progress or is impending, and instructs request module 318 to transmit the request. Request module 318 may include specific instructions and metadata in the request. Request module 318 generates the signals necessary to control a transceiver device (e.g., transceiver device 104) such that the request is transmitted. A request may be transmitted according to any protocol, frequency, or standard which may be predefined and set by configuration data 312 or preference data 314.

In one embodiment, request module 318 generates a request that specifies that all available data should be actively acquired and recorded by a nearby vehicle receiving the request (the "witness" vehicle). Alternatively, the request may specify that only certain types of data should be recorded. For example, the request may specify that radar information or lidar information is desired. The request may specify that only data related to the requesting vehicle is desired. The request may specify that data related to additional vehicles is also desired. The request may specify that data related to a particular site (i.e., that of the actual or predicted accident) is desired. The request may specify a time window for the recorded data (e.g., only that acquired after the request, previously acquired data, both new and previously acquired data, etc.). The request may specify that the witness vehicle additionally acquire and/or record data from passive sensors (e.g., cameras, microphones, etc.). The request may specify that the witness vehicle record identification data regarding the witness vehicle, its operator, or its owner. The request may ask the witness vehicle to acknowledge receipt of the request, to explicitly accept or refuse the request, to report an inability to acquire or record the data, etc. The request may specify that the witness vehicle should store positioning coordinates of the witness vehicle or any other detected vehicles. The request may specify that the witness vehicle store the velocity (translational and/or angular) and orientation of the witness vehicle or of other vehicles as detected by the witness vehicle. The request may specify that the witness vehicle contour information other vehicles as detected by the witness vehicle. The request may specify that the witness vehicle store timing information related to the accident so that any other data stored may be synced.

In one embodiment, request module 318 generates metadata to be included with a request. The metadata may include any number of data items related to the vehicle having the accident. For example, the metadata may include positioning coordinates, velocity and orientation information, insurance information (e.g., policy number, insurance company), contact information for an operator/driver of the vehicle (e.g., a phone number, name, address, etc.), an internet address, payment information, a timestamp of when the request was generated, and/or a vehicle ID (e.g., license plate number, VIN number, driver's license number, etc.). If insurance information is included, such information may be used by the witness vehicle so that the proper insurance company can be contacted and/or provided the recorded data. If contact information is included it may be used so that the driver can be provided the recorded data or so that the driver can be notified that the accident related data has been recorded. The request may also direct the witness vehicle to automatically transmit the recorded data to an external storage location (e.g., a website, a cloud storage service, an FTP site, an email address, etc.) as dictated by the internet address. In one scenario, a witness vehicle may record data or provide access to recorded data for a price. In such a scenario, payment information and an offered price may be included in the request. A price that the driver is willing to pay to have data recorded by a witness vehicle may be previously specified (e.g., by preference data 314). After a request is generated, it is then transmitted by a transceiver.

In one embodiment, a request includes instructs a witness vehicle to transmit any recorded data back to the requesting vehicle. For example, transceiver device 104 may be used to send the request, and receive any response data (including recorded accident data, ID information for the witness vehicle, etc.) from the witness vehicle. In this manner, a copy of the recorded data may be received and stored on a storage device of the requesting vehicle.

Figure 4:
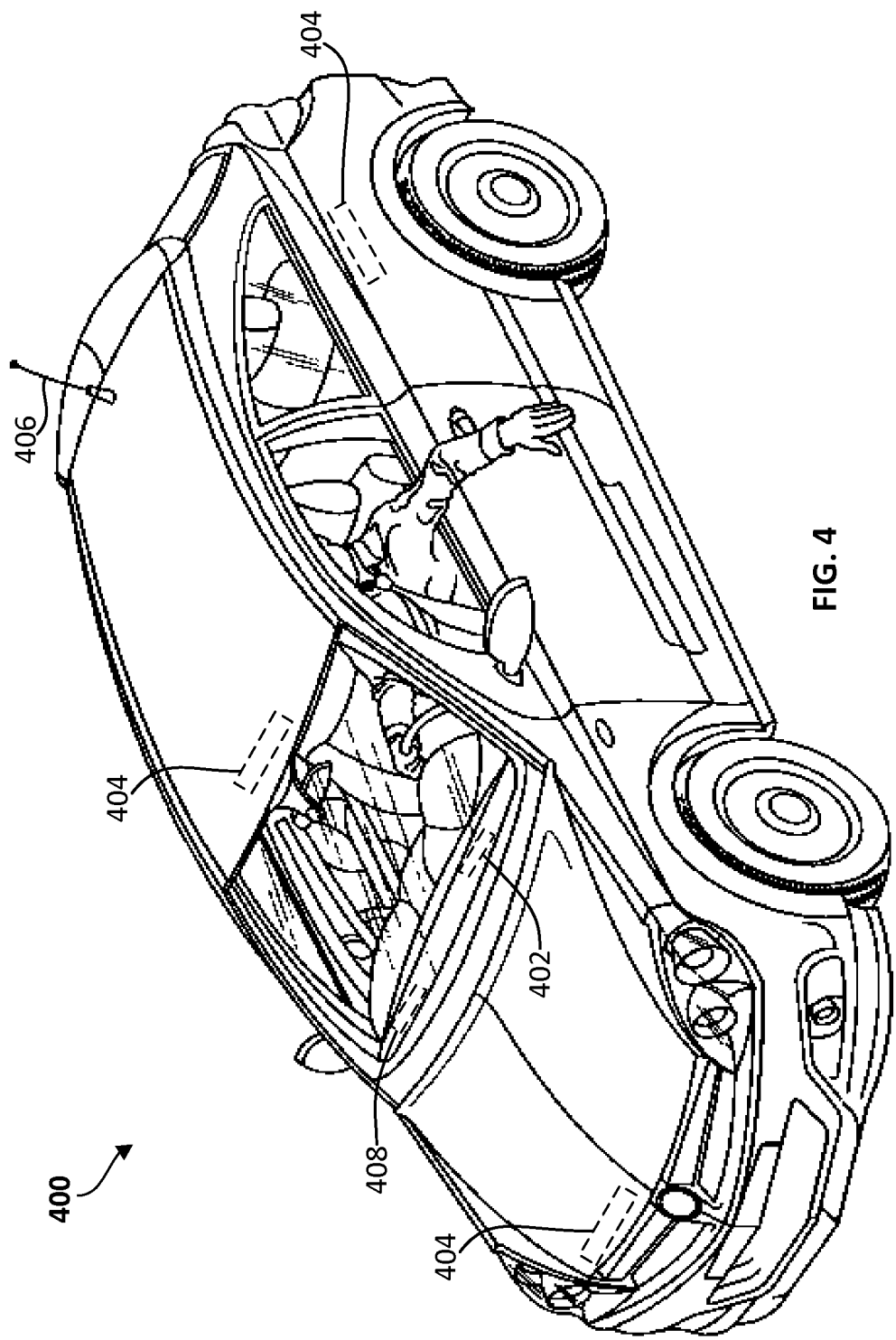
FIG. 4 is a schematic diagram of a system for documenting an accident according to one embodiment.

Referring to FIG. 4, a schematic diagram of a vehicle 400 is shown according to one embodiment. Vehicle 400 has a system for documenting an accident (e.g., system 100 or system 200). Vehicle 400 includes processing circuit 402, collision detection device 404 (which is shown as having multiple components), transceiver 406, and storage device 408. Collision detection device 404 may have any number of radar device and lidar devices integrated throughout vehicle 400. For example, vehicle 400 may have radar antennas at the front, rear, left and right of vehicle 400. As another example, vehicle 400 may have a radar or lidar device on the roof of vehicle 400, such that the radar or lidar device may scan in 360 degrees. Collision detection device 404 may also include other sensing devices, such as one or more cameras, ultrasonic devices, microphones, and RFID sensors. Vehicle 400 further includes storage device 408. Storage device 408 may include one or more hard drives, flash drives, optical drives, and any other storage devices capable of storing data.

Figure 5:
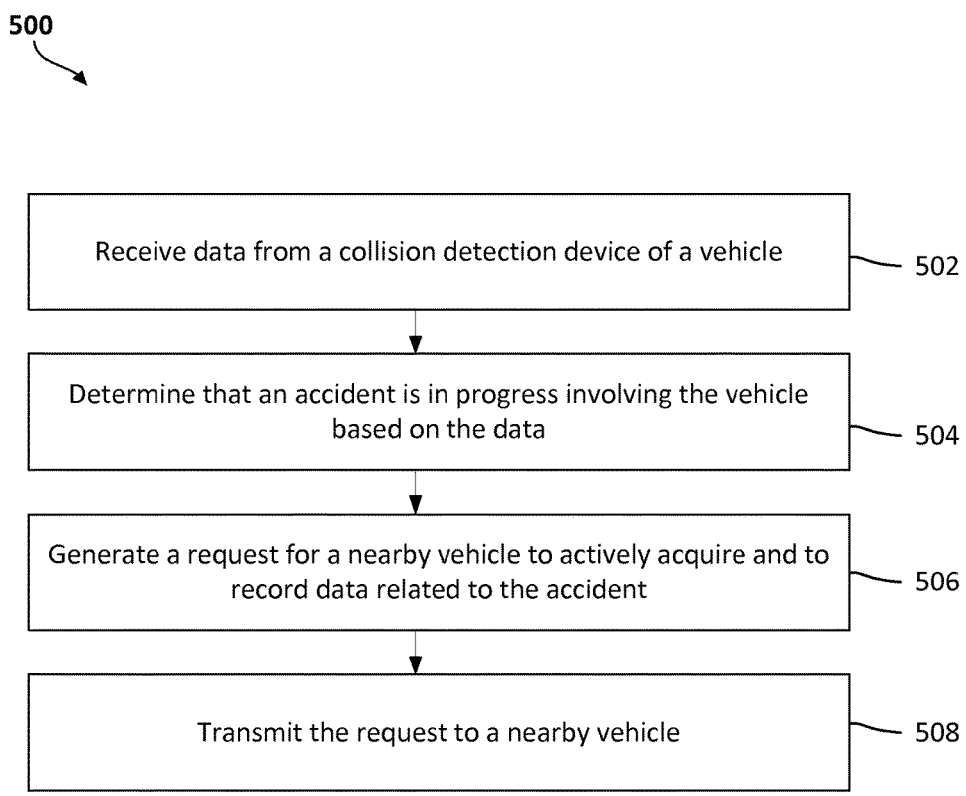
FIG. 5 is a flowchart of a process for documenting an accident according to one embodiment.

Referring to FIG. 5, a flow diagram of a process 500 for documenting an accident is shown, according to one embodiment. In alternative embodiments, fewer, additional, and/or different actions may be performed. Also, the use of a flow diagram is not meant to be limiting with respect to the order of actions performed. Data is received from a collision detection device of a vehicle (502). For example, the vehicle may have various collision detection devices integrated into the vehicle, including radar, lidar, camera, and/or ultrasonic devices. Based on the data from the collision detection device, an accident involving the vehicle is determined to be occurring or impending (504). A request is generated (506) and transmitted (508) to another nearby vehicle (e.g. a witness vehicle). The request is for the nearby vehicle to actively acquire and to record data related to the accident (i.e. from the perspective of the nearby vehicle).

Figure 6:
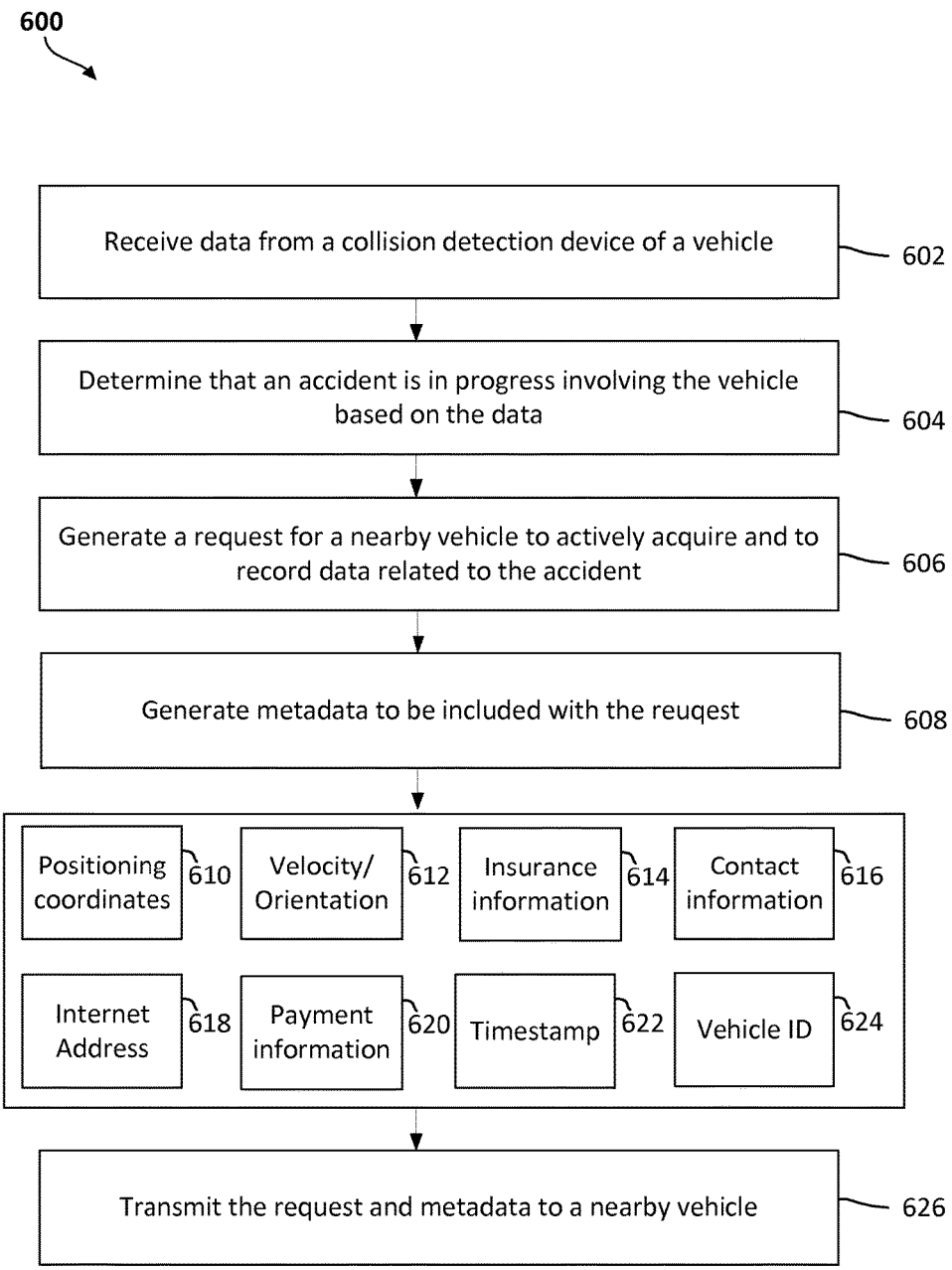
FIG. 6 is a flowchart of a process for documenting an accident according to one embodiment.

Referring to FIG. 6, a flow diagram of a process 600 for documenting an accident is shown, according to one embodiment. In alternative embodiments, fewer, additional, and/or different actions may be performed. Also, the use of a flow diagram is not meant to be limiting with respect to the order of actions performed. Data is received from a collision detection device of a vehicle (602). Based on the data from the collision detection device, an accident involving the vehicle is determined to be occurring or impending (604). A request is generated (606) to be transmitted to a nearby vehicle. The request is for the nearby vehicle to actively acquire and to record data related to the accident. Metadata is generated (608) to be included with the request. The metadata may include various data items related to the vehicle having the accident and transmitting the request. For example, the metadata may include position coordinates (e.g., GPS data, mapping data, etc.) (610), velocity and/or orientation information (612), insurance information (e.g., insurance company, policy number, etc.) (614), contact information (e.g., name, address, phone number, email, etc.) (616), payment information (e.g., for a fee paid to the operator of the nearby vehicle for recording the data) (620), timestamp data (622), and the vehicle's ID information (license plate number, VIN number, make and model, etc.) (624). The metadata may also include an internet address (618) to which any recorded data should be sent. For example, the request may specify that the nearby vehicle (that recorded the accident related data) should upload the recorded data to a certain website, FTP site, online storage service, etc., as defined by the internet address. The request and metadata are transmitted (626) to the nearby vehicle.

Figure 7:
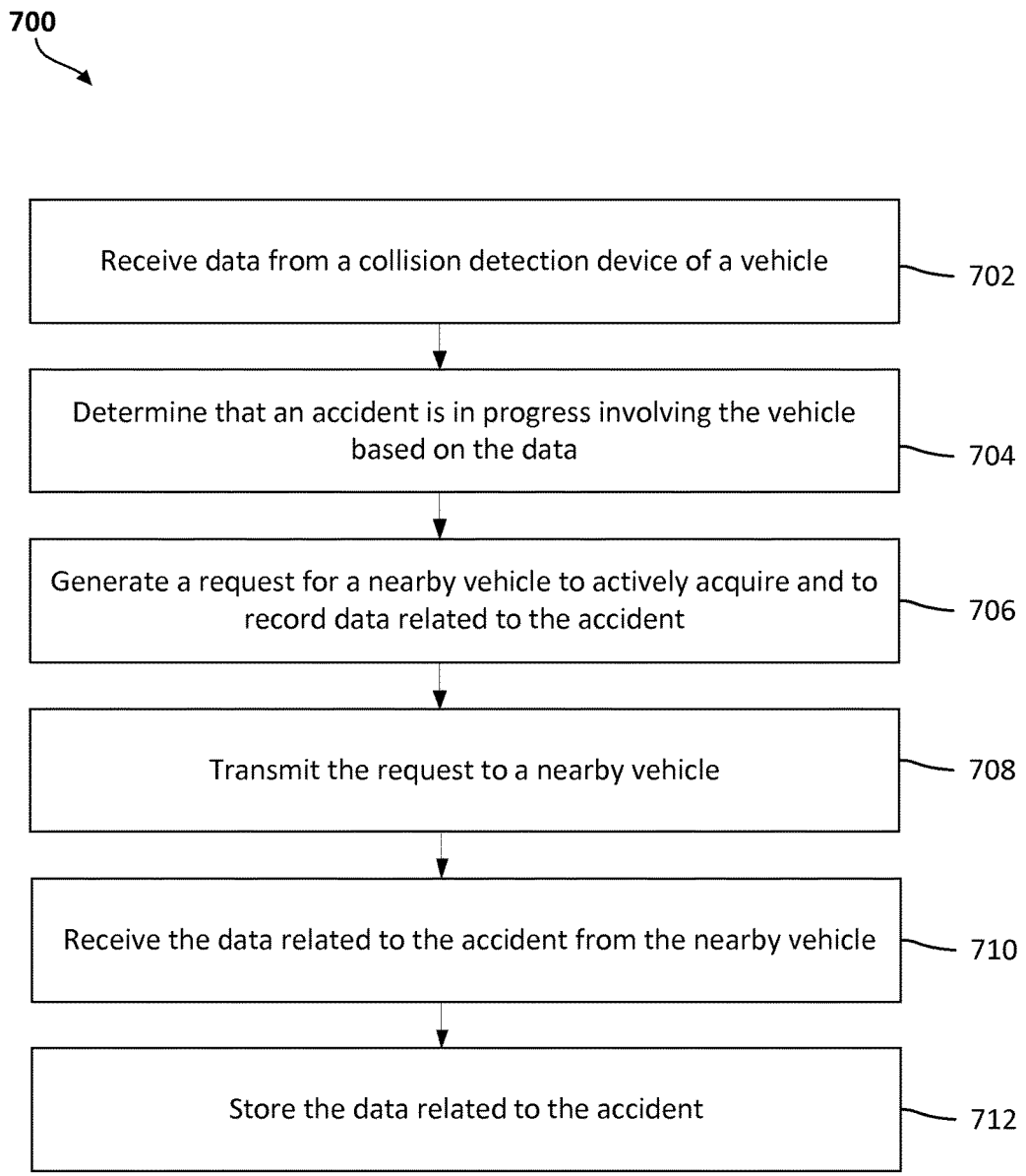
FIG. 7 is a flowchart of a process for documenting an accident according to one embodiment.

Referring to FIG. 7, a flow diagram of a process 700 for documenting an accident is shown, according to one embodiment. In alternative embodiments, fewer, additional, and/or different actions may be performed. Also, the use of a flow diagram is not meant to be limiting with respect to the order of actions performed. Data is received from a collision detection device of a vehicle (702). Based on the data from the collision detection device, an accident involving the vehicle is determined to be occurring or impending (704). A request is generated (706) and transmitted (708) to a nearby vehicle. The request is for the nearby vehicle to actively acquire and to record data related to the accident. Any recorded data related to the accident may then be received by the vehicle that had the accident (710). The received data related to the accident is stored (712) in a storage device in the vehicle (e.g., a hard drive, a flash drive, etc.).

Figure 8:
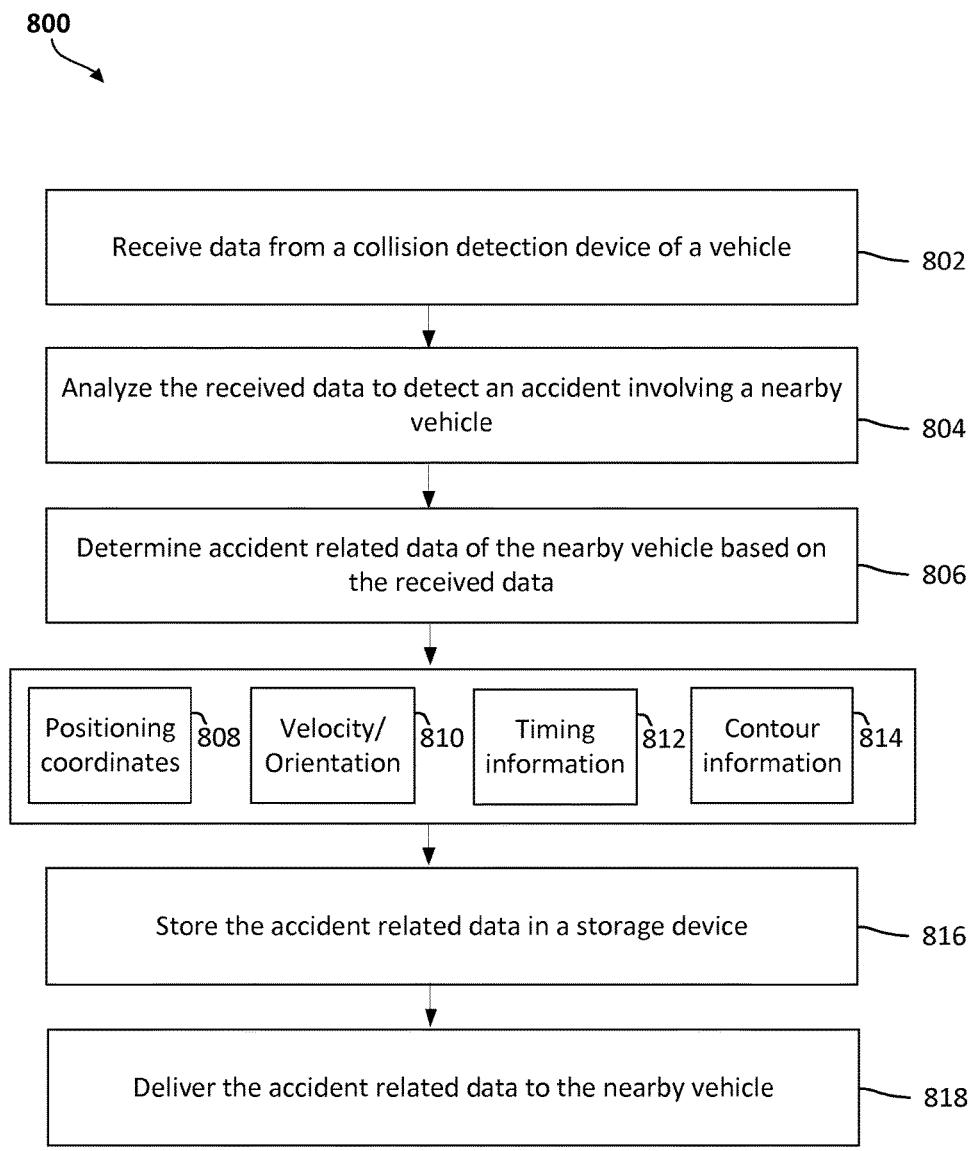
FIG. 8 is a flowchart of a process for documenting an accident according to one embodiment.

Referring to FIG. 8, a flow diagram of a process 800 for documenting an accident is shown, according to one embodiment. In alternative embodiments, fewer, additional, and/or different actions may be performed. Also, the use of a flow diagram is not meant to be limiting with respect to the order of actions performed. Data is received from a collision detection device of a vehicle (802). The received data is analyzed (804) to detect an accident involving a nearby vehicle. If an accident is detected to be occurring or impending, accident related data is determined based on the received data (806). For example, the accident related data may include positioning coordinates (e.g., GPS information, mapping information, etc.) (808) of a vehicle involved in the accident. As another example, the accident related data may include velocity and orientation information (810) of a vehicle involved in the accident. As another example, the accident related data may include timing information (812)

related to a vehicle involved in the accident. As another example, the accident related data may include contour information (814) of a vehicle involved in the accident. The accident related data is stored (816) in a storage device. The accident related data is delivered to the nearby vehicle (818).

Figure 9:
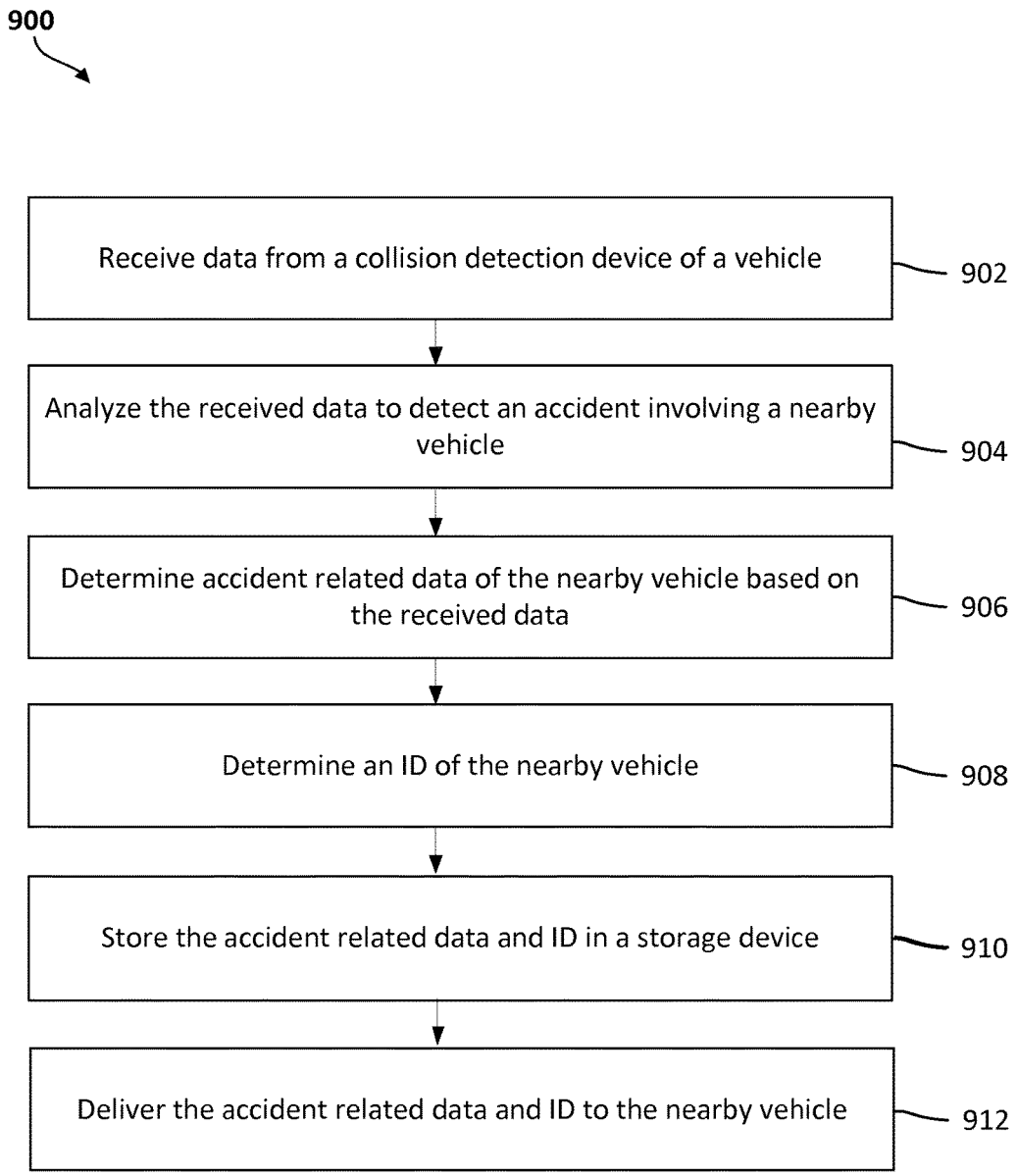
FIG. 9 is a flowchart of a process for documenting an accident according to one embodiment.

Referring to FIG. 9, a flow diagram of a process 900 for documenting an accident is shown, according to one embodiment. In alternative embodiments, fewer, additional, and/or different actions may be performed. Also, the use of a flow diagram is not meant to be limiting with respect to the order of actions performed. Data is received from a collision detection device of a vehicle (902). The received data is analyzed (904) to detect an accident involving a nearby vehicle. If an accident is detected to be occurring or impending, accident related data is determined based on the received data (906). In addition, an ID of the nearby vehicle is determined (908). For example, the vehicle may include a camera system that can detect a license plate number of the nearby vehicle. As another example, the vehicle may include an RFID sensor system that can detect an RFID tag of the nearby vehicle. The accident related data and determined ID are stored (910) in a storage device. The accident related data and ID are delivered to the nearby vehicle (912).

Figure 10:
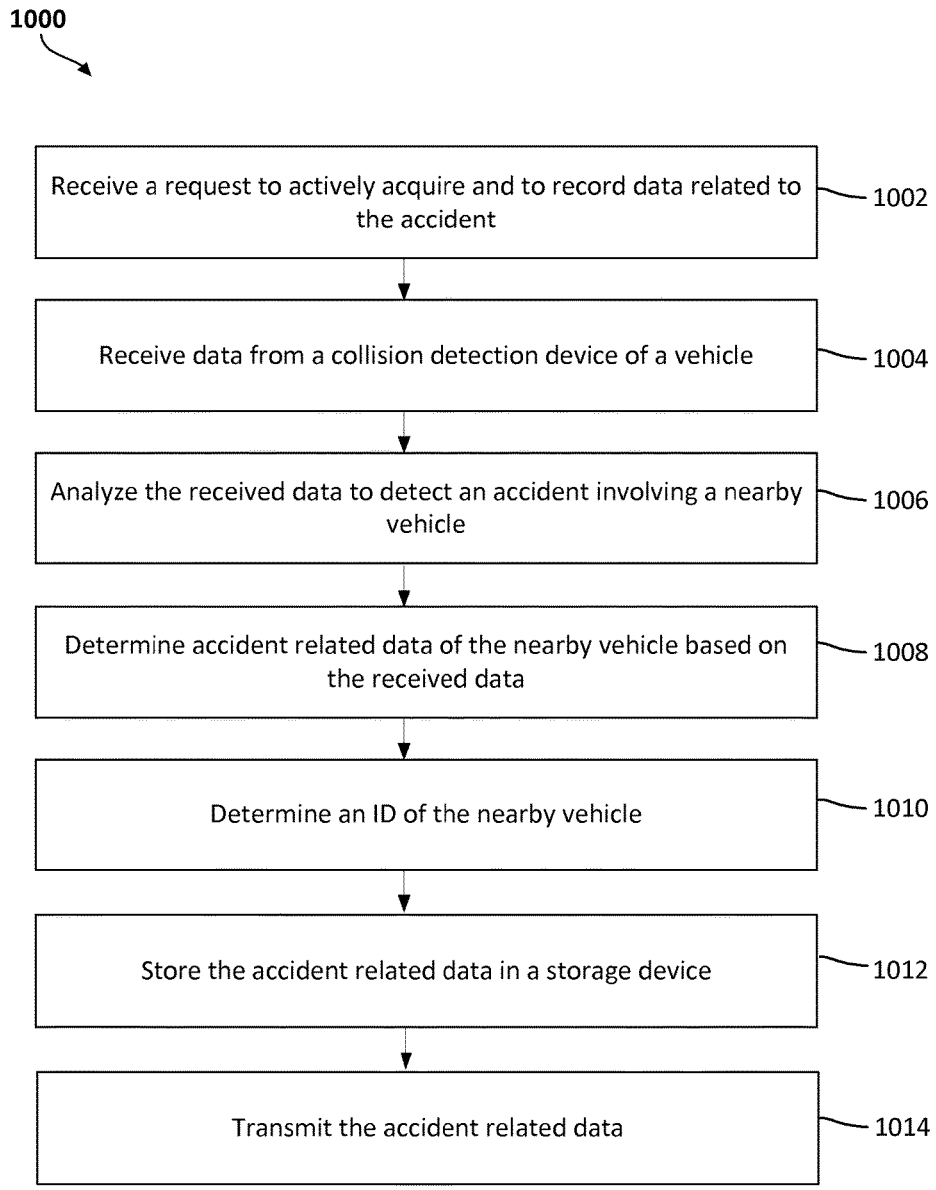
FIG. 10 is a flowchart of a process for documenting an accident according to one embodiment.

Referring to FIG. 10, a flow diagram of a process 1000 for documenting an accident is shown, according to one embodiment. In alternative embodiments, fewer, additional, and/or different actions may be performed. Also, the use of a flow diagram is not meant to be limiting with respect to the order of actions performed. A request is received at a vehicle, where the request is sent from a nearby vehicle and is for the vehicle to actively acquire and to record data related to the accident. In response to the request, data is received from a collision detection device of a vehicle (1004). The received data is analyzed (1006) to detect an accident involving the nearby vehicle. Accident related data is determined based on the received data (1008). In addition, an ID of the nearby vehicle is determined (1010). The accident related data and determined ID are stored (1012) in a storage device. The initial request may also specify that the data should be transmitted according to the instructions of the request. In this situation, the accident related data is transmitted (1014). For example, the accident related data may be transmitted to the nearby vehicle that requested the data. As another example, the accident related data may be transmitted to a remote storage location (e.g., an FTP site, a website, a cloud data storage service, etc.).

Figure 11:
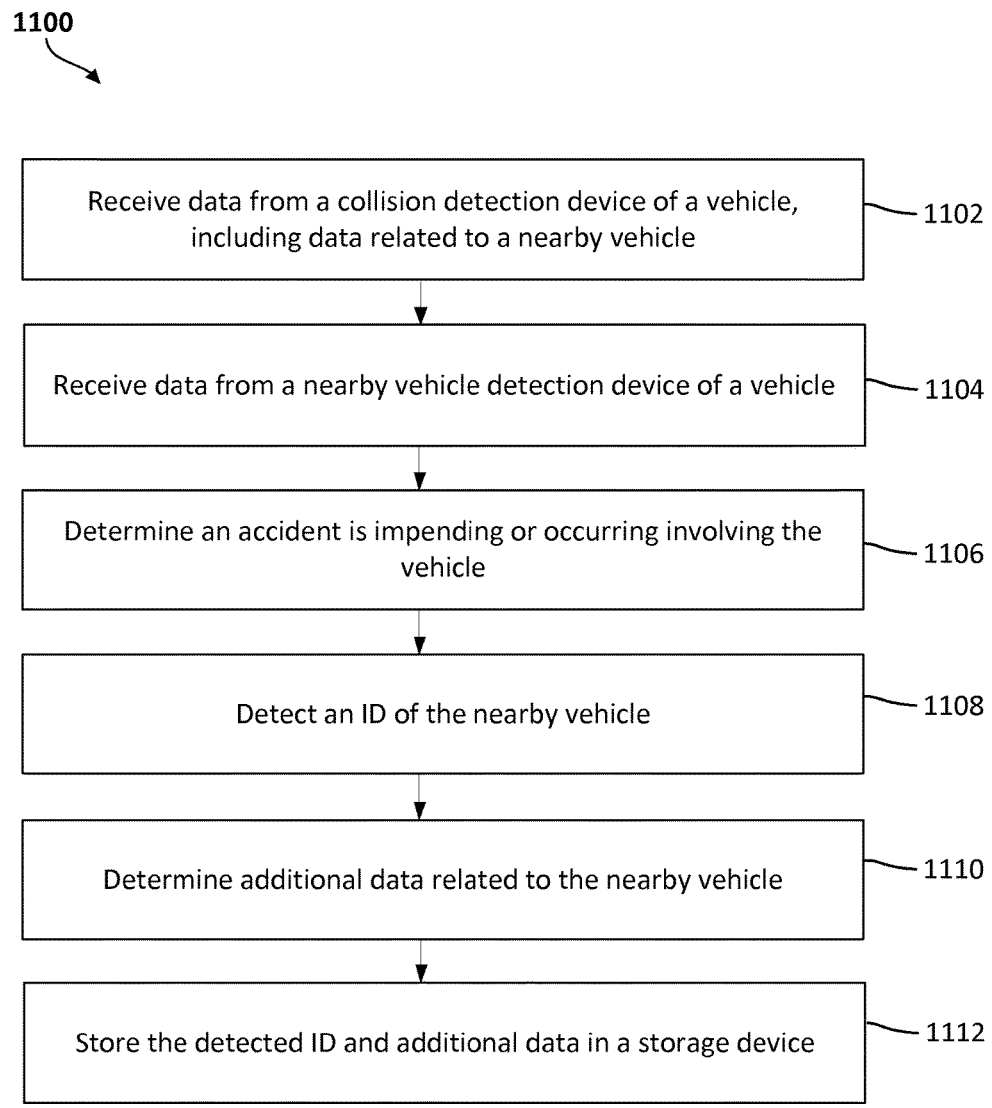
FIG. 11 is a flowchart of a process for documenting an accident according to one embodiment.

Referring to FIG. 11, a flow diagram of a process 1100 for documenting an accident is shown, according to one embodiment. In alternative embodiments, fewer, additional, and/or different actions may be performed. Also, the use of a flow diagram is not meant to be limiting with respect to the order of actions performed. Data is received from a collision detection device of a vehicle (1102). The collision detection device may include one or more cameras, accelerometers, microphones, radar device, and/or lidar devices, etc. The received data from the collision detection device includes data related to the vehicle (e.g., collision data, sensor data, speed data, brake system data, etc.). Data is received from a nearby vehicle detection device of a vehicle (1104). The nearby vehicle detection device may include one or more cameras, RFID sensors, radar devices, lidar devices, etc. The received data from the nearby vehicle detection device includes data related to a nearby vehicle. The received data from the collision detection device is analyzed to determine that an accident is impending or occurring involving the vehicle (1106). Responsive to determining that the accident is impending or occurring, the received data from the nearby vehicle detection device is analyzed to detect an ID of the nearby vehicle (1108). Additional data related to the nearby vehicle may also be determined (e.g., the position, direction of motion, speed, orientation, and/or contour of the nearby vehicle, etc.) (1110). For example, data from radar and/or lidar devices of the vehicle may be analyzed to determine the additional data. The detected ID and the additional data are stored in a storage device (1112).

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A non-transitory computer-readable medium having instructions stored thereon, that when executed by a computing device cause the computing device to perform operations for documenting an accident, the operations comprising:
   receiving data from a collision detection device of a vehicle;
   determining, based on the received data, that an accident is impending or occurring involving the vehicle;
   generating a request for a nearby vehicle to:
      illuminate a region associated with the accident and actively acquire data related to the accident; and
      record actively acquired data related to the accident; and
   transmitting the request to the nearby vehicle.

2. The non-transitory computer-readable medium of claim 1, wherein the data related to the accident includes data related to the vehicle as detected by the nearby vehicle.

3. The non-transitory computer-readable medium of claim 1, wherein the data related to the accident comprises at least one of contour data, position data, velocity data, orientation data, and timing data.

4. The non-transitory computer-readable medium of claim 1, wherein the data related to the accident includes data related to an additional vehicle as detected by the nearby vehicle.

5. The non-transitory computer-readable medium of claim 1, wherein the request specifies that the nearby vehicle acquire radar data related to the accident.

6. The non-transitory computer-readable medium of claim 1, wherein the request specifies that the nearby vehicle acquire lidar data related to the accident.

7. The non-transitory computer-readable medium of claim 1, wherein the request directs the nearby vehicle to record identification of at least one of the nearby vehicle, an operator of the nearby vehicle, and an owner of the nearby vehicle.

8. The non-transitory computer-readable medium of claim 1, wherein the request directs the nearby vehicle to store positioning coordinates of the nearby vehicle.

9. The non-transitory computer-readable medium of claim 1, wherein the request directs the nearby vehicle to store a velocity and an orientation of the nearby vehicle.

10. The non-transitory computer-readable medium of claim 1, wherein the request directs the nearby vehicle to store timing information related to the nearby vehicle.

11. The non-transitory computer-readable medium of claim 1, wherein the operations further comprise:
   receiving the data related to the accident from the nearby vehicle, wherein the request directs the nearby vehicle to transmit the data related to the accident to the vehicle; and
   storing the data related to the accident in a storage device.

12. The non-transitory computer-readable medium of claim 11, wherein the operations further comprise encrypting the data related to the accident.

13. The non-transitory computer-readable medium of claim 1, wherein the operations further comprise:
   receiving, from a sensor device, sensor data related to an ID of the nearby vehicle;
   determining the ID of the nearby vehicle based on the sensor data; and
   storing the ID of the nearby vehicle in a storage device.

14. A non-transitory computer-readable medium having instructions stored thereon, that when executed by a computing device cause the computing device to perform operations for documenting an accident, the operations comprising:
   illuminating and actively detecting a nearby vehicle using a collision detection device of a vehicle, wherein the collision detection device comprises at least one of a radar device and a lidar device;
   receiving data from the collision detection device of the vehicle;
   analyzing the received data to detect an impending or occurring accident, wherein the accident involves the nearby vehicle;
   determining accident related data in response to the detected accident, wherein the accident related data is based on the received data;
   storing the accident related data in a storage device; and
   delivering the accident related data to the nearby vehicle.

15. The non-transitory computer-readable medium of claim 14, wherein the accident related data includes positioning coordinates of the nearby vehicle.

16. The non-transitory computer-readable medium of claim 14, wherein the accident related data includes a velocity and an orientation of the nearby vehicle.

17. The non-transitory computer-readable medium of claim 14, wherein the accident related data includes timing information related to the nearby vehicle.

18. The non-transitory computer-readable medium of claim 14, wherein the operations further comprise receiving a request to record data related to the accident.

19. The non-transitory computer-readable medium of claim 18, wherein detecting the accident is responsive to receiving the request.

20. The non-transitory computer-readable medium of claim 18, wherein the operations further comprise delivering the accident related data to a source of the request.

21. The non-transitory computer-readable medium of claim 14, wherein detecting the accident is based on detecting a sudden velocity change in the nearby vehicle.

22. The non-transitory computer-readable medium of claim 14, wherein the processing circuit is configured to deliver the accident related data to an address associated with the nearby vehicle.

23. A non-transitory computer-readable medium having instructions stored thereon, that when executed by a computing device cause the computing device to perform operations for documenting an accident, the operations comprising:
   receiving data from a nearby vehicle detection device of a vehicle, wherein the data includes data related to a nearby vehicle;
   receiving data from a collision detection device of the vehicle;
   determining that based on the received data from the collision detection device an accident is impending or occurring involving the vehicle;
   analyzing the received data from the nearby vehicle detection device to detect an ID of the nearby vehicle; and
   storing the detected ID in a storage device.

24. The non-transitory computer-readable medium of claim 23, wherein analyzing the received data from the nearby vehicle detection device to detect the ID and storing the detected ID are responsive to the determining that the accident is impending or occurring.

25. The non-transitory computer-readable medium of claim 23, wherein the operations further comprise analyzing the received data to determine whether the nearby vehicle was involved in the accident, wherein analyzing the received data from the nearby vehicle detection device to detect the ID and storing the detected ID are responsive to determining that the nearby vehicle was not involved in the accident.

26. The non-transitory computer-readable medium of claim 23, wherein the nearby vehicle detection devices includes a camera, wherein the received data from the nearby vehicle detection device includes image data from the camera, and wherein the ID of the nearby vehicle includes a license plate number.

27. The non-transitory computer-readable medium of claim 23, wherein the nearby vehicle detection devices includes a camera, wherein the received data from the nearby vehicle detection device includes image data from the camera, and wherein the ID of the nearby vehicle includes a make and a model of the nearby vehicle.

28. The non-transitory computer-readable medium of claim 23, wherein the nearby vehicle detection device comprises an RFID sensor, and wherein the ID of the nearby vehicle is based on an RFID tag of the nearby vehicle.

29. The non-transitory computer-readable medium of claim 28, wherein the RFID tag includes a license plate number.

30. The non-transitory computer-readable medium of claim 28, wherein the RFID tag includes a make and a model of the nearby vehicle.

31. The non-transitory computer-readable medium of claim 23, wherein the nearby vehicle is a vehicle to which a request was previously transmitted by the vehicle, and wherein the request is for the nearby vehicle to:
 illuminate a region associated with the accident and actively acquire data related to the accident; and
 record the actively acquired data related to the accident.

32. The non-transitory computer-readable medium of claim 23, wherein the operations further comprise analyzing the received data from the nearby vehicle detection device to determine additional data related to the nearby vehicle, and wherein the additional data is stored in association with the detected ID.

33. The non-transitory computer-readable medium of claim 32, wherein the additional data includes at least one of a location of the nearby vehicle, a speed of the nearby vehicle, and an orientation of the nearby vehicle relative to the accident.

34. The non-transitory computer-readable medium of claim 23, wherein the nearby vehicle detection device comprises at least one of a radar device and a lidar device, and wherein the nearby vehicle detection device is configured to illuminate and actively detect the nearby vehicle.

35. The non-transitory computer-readable medium of claim 23, wherein the collision detection device comprises at least one of an accelerometer, a microphone, a radar device, a lidar device, and a camera.

* * * * *